United States Patent
Gagner et al.

(10) Patent No.: US 9,047,731 B2
(45) Date of Patent: *Jun. 2, 2015

(54) WAGERING GAME ACCOUNT MANAGEMENT SYSTEM

(71) Applicant: WMS Gaming, Inc., Waukegan, IL (US)

(72) Inventors: Mark B. Gagner, West Chicago, IL (US); Jacek A. Grabiec, Chicago, IL (US); Damon E. Gura, Chicago, IL (US); Erhard W. Rathsack, Reno, NV (US); Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/777,357

(22) Filed: Feb. 26, 2013

(65) Prior Publication Data

US 2013/0172075 A1  Jul. 4, 2013

Related U.S. Application Data

(63) Continuation of application No. 12/513,486, filed as application No. PCT/US2007/084316 on Nov. 9, 2007, now Pat. No. 8,419,527.

(60) Provisional application No. 60/865,057, filed on Nov. 9, 2006.

(51) Int. Cl.
*G07F 17/32* (2006.01)
*G06Q 20/04* (2012.01)
(Continued)

(52) U.S. Cl.
CPC ............ *G07F 17/3244* (2013.01); *G06Q 20/04* (2013.01); *G06Q 40/02* (2013.01); *G07F 17/3255* (2013.01); *A63F 13/00* (2013.01)

(58) Field of Classification Search
CPC .......................... G07F 17/3225; G07F 17/3244
USPC .............................................. 463/25; 705/39
See application file for complete search history.

(56) References Cited

U.S. PATENT DOCUMENTS 4,240,635 A   12/1980  Brown
4,283,709 A   8/1981   Lucero et al.
(Continued)

FOREIGN PATENT DOCUMENTS

EP   0769769    4/1997
JP   10192537   7/1998
(Continued)

OTHER PUBLICATIONS

U.S. Appl. No. 13/437,657, filed Apr. 2, 2012, Agarwal, Vijay K., et al.

(Continued)

*Primary Examiner* — Corbett B Coburn
(74) *Attorney, Agent, or Firm* — DeLizio Law, PLLC

(57) ABSTRACT

A wagering game account management system and its operations are described herein. In embodiments, the operations include detecting an account rule, wherein the account rule includes an activation event, wherein upon occurrence of the activation event a transfer of funds is initiates between a wagering game session and account and one or more other financial accounts. In some embodiments, the operations also include detecting the occurrence of the activation event. In some embodiments, the operations also include initiating the transfer of funds between the wagering game session account and one or more other financial accounts.

23 Claims, 13 Drawing Sheets

(51) Int. Cl.
 *G06Q 40/02* (2012.01)
 *A63F 13/00* (2014.01)

(56) References Cited

U.S. PATENT DOCUMENTS

| | | | |
|---|---|---|---|
| 4,335,809 A | 6/1982 | Wain | |
| 4,339,798 A | 7/1982 | Hedges et al. | |
| 4,359,631 A | 11/1982 | Lockwood et al. | |
| 4,467,424 A | 8/1984 | Hedges et al. | |
| 4,494,197 A | 1/1985 | Troy et al. | |
| 4,575,622 A | 3/1986 | Pellegrini | |
| 4,636,951 A | 1/1987 | Harlick | |
| 4,648,600 A | 3/1987 | Olliges | |
| 4,669,730 A | 6/1987 | Small | |
| 4,760,527 A | 7/1988 | Sidley | |
| 4,815,741 A | 3/1989 | Small | |
| 4,842,278 A | 6/1989 | Markowicz | |
| 4,856,787 A | 8/1989 | Itkis | |
| 4,880,237 A | 11/1989 | Kishishita | |
| 4,882,473 A | 11/1989 | Bergeron et al. | |
| 4,926,327 A | 5/1990 | Sidley | |
| 4,994,908 A | 2/1991 | Kuban et al. | |
| 5,038,022 A | 8/1991 | Lucero | |
| 5,069,453 A | 12/1991 | Koza et al. | |
| 5,119,295 A | 6/1992 | Kapur | |
| 5,159,549 A | 10/1992 | Hallman, Jr. et al. | |
| 5,179,517 A | 1/1993 | Sarbin et al. | |
| 5,197,094 A | 3/1993 | Tillery et al. | |
| 5,223,698 A | 6/1993 | Kapur | |
| 5,259,613 A | 11/1993 | Marnell, II | |
| 5,265,874 A | 11/1993 | Dickinson et al. | |
| 5,276,312 A | 1/1994 | McCarthy | |
| 5,287,269 A | 2/1994 | Dorrough et al. | |
| 5,297,802 A | 3/1994 | Pocock et al. | |
| 5,324,035 A | 6/1994 | Morris et al. | |
| 5,326,104 A | 7/1994 | Pease et al. | |
| 5,332,076 A | 7/1994 | Ziegert | |
| 5,371,345 A | 12/1994 | LeStrange et al. | |
| 5,408,417 A | 4/1995 | Wilder | |
| 5,429,361 A | 7/1995 | Raven et al. | |
| 5,457,306 A | 10/1995 | Lucero | |
| 5,470,079 A | 11/1995 | LeStrange et al. | |
| 5,505,449 A | 4/1996 | Eberhardt et al. | |
| 5,524,888 A | 6/1996 | Heidel | |
| 5,559,312 A | 9/1996 | Lucero | |
| 5,581,461 A | 12/1996 | Coll et al. | |
| 5,586,937 A | 12/1996 | Menashe | |
| 5,611,730 A | 3/1997 | Weiss | |
| 5,613,912 A | 3/1997 | Slater | |
| 5,655,961 A | 8/1997 | Acres et al. | |
| 5,674,128 A | 10/1997 | Holch et al. | |
| 5,722,890 A | 3/1998 | Libby et al. | |
| 5,732,398 A | 3/1998 | Tagawa | |
| 5,755,621 A | 5/1998 | Marks et al. | |
| 5,761,647 A | 6/1998 | Boushy | |
| 5,762,552 A | 6/1998 | Vuong et al. | |
| 5,770,533 A | 6/1998 | Franchi | |
| 5,797,794 A | 8/1998 | Angell | |
| 5,800,269 A | 9/1998 | Holch et al. | |
| 5,811,772 A | 9/1998 | Lucero | |
| 5,823,879 A | 10/1998 | Goldberg et al. | |
| 5,830,067 A | 11/1998 | Graves et al. | |
| 5,830,068 A | 11/1998 | Brenner et al. | |
| 5,830,069 A | 11/1998 | Soltesz et al. | |
| 5,836,817 A | 11/1998 | Acres et al. | |
| 5,857,911 A | 1/1999 | Fioretti | |
| 5,871,398 A | 2/1999 | Schneier et al. | |
| 5,917,725 A | 6/1999 | Thacher et al. | |
| 5,919,091 A | 7/1999 | Bell et al. | |
| 5,949,411 A | 9/1999 | Doerr et al. | |
| 5,952,640 A | 9/1999 | Lucero | |
| 5,959,277 A | 9/1999 | Lucero | |
| 5,971,271 A | 10/1999 | Wynn et al. | |
| 5,971,849 A | 10/1999 | Falciglia | |
| 5,984,779 A | 11/1999 | Bridgeman et al. | |
| 6,019,283 A | 2/2000 | Lucero | |
| 6,024,640 A | 2/2000 | Walker et al. | |
| 6,039,648 A | 3/2000 | Guinn et al. | |
| 6,048,269 A | 4/2000 | Burns et al. | |
| 6,049,823 A | 4/2000 | Hwang | |
| 6,089,982 A | 7/2000 | Holch et al. | |
| 6,093,100 A | 7/2000 | Singer et al. | |
| 6,101,477 A | 8/2000 | Hohle et al. | |
| 6,110,041 A | 8/2000 | Walker et al. | |
| 6,113,495 A | 9/2000 | Walker et al. | |
| 6,120,024 A | 9/2000 | Lind | |
| 6,141,006 A | 10/2000 | Knowlton et al. | |
| 6,168,522 B1 | 1/2001 | Walker et al. | |
| 6,183,366 B1 | 2/2001 | Goldberg et al. | |
| 6,247,643 B1 | 6/2001 | Lucero | |
| 6,264,560 B1 | 7/2001 | Goldberg et al. | |
| 6,280,326 B1 | 8/2001 | Saunders | |
| 6,280,328 B1 | 8/2001 | Holch et al. | |
| 6,319,125 B1 | 11/2001 | Acres | |
| 6,322,446 B1 | 11/2001 | Yacenda | |
| 6,347,086 B1 | 2/2002 | Strachan | |
| 6,358,151 B1 | 3/2002 | Enzminger et al. | |
| 6,383,078 B1 | 5/2002 | Yacenda | |
| 6,409,602 B1 | 6/2002 | Wiltshire et al. | |
| 6,471,590 B2 | 10/2002 | Saunders | |
| 6,508,709 B1 | 1/2003 | Karmarkar | |
| 6,629,890 B2 | 10/2003 | Johnson | |
| 7,022,017 B1 | 4/2006 | Halbritter et al. | |
| 7,128,652 B1 | 10/2006 | Lavoie et al. | |
| 8,190,518 B2 * | 5/2012 | Rathbun et al. | 705/39 |
| 8,560,439 B2 * | 10/2013 | Hahn-Carlson | 705/39 |
| 8,784,192 B2 | 7/2014 | Gagner et al. | |
| 2001/0003100 A1 | 6/2001 | Yacenda | |
| 2001/0031663 A1 | 10/2001 | Johnson | |
| 2002/0002075 A1 | 1/2002 | Rowe | |
| 2002/0028709 A1 | 3/2002 | Finer et al. | |
| 2002/0077178 A1 | 6/2002 | Oberberger et al. | |
| 2002/0111213 A1 | 8/2002 | McEntee et al. | |
| 2002/0147047 A1 | 10/2002 | Letovsky et al. | |
| 2002/0166126 A1 | 11/2002 | Pugh et al. | |
| 2003/0027631 A1 | 2/2003 | Hedrick et al. | |
| 2003/0054868 A1 | 3/2003 | Paulsen et al. | |
| 2003/0100371 A1 | 5/2003 | Gatto et al. | |
| 2003/0104863 A1 | 6/2003 | Park | |
| 2003/0212636 A1 | 11/2003 | Resnick | |
| 2003/0224854 A1 | 12/2003 | Joao | |
| 2004/0084524 A1 | 5/2004 | Ramachandran | |
| 2004/0102238 A1 | 5/2004 | Taylor | |
| 2004/0121841 A1 | 6/2004 | Xidos et al. | |
| 2004/0147313 A1 | 7/2004 | Stanley et al. | |
| 2004/0231018 A1 | 11/2004 | Olson | |
| 2005/0020354 A1 | 1/2005 | Nguyen et al. | |
| 2005/0064938 A1 | 3/2005 | Xidos et al. | |
| 2005/0101383 A1 | 5/2005 | Wells | |
| 2005/0107156 A1 | 5/2005 | Potts et al. | |
| 2005/0187012 A1 | 8/2005 | Walker et al. | |
| 2006/0100009 A1 | 5/2006 | Walker et al. | |
| 2006/0121972 A1 | 6/2006 | Walker et al. | |
| 2006/0121979 A1 | 6/2006 | Kennard et al. | |
| 2006/0154722 A1 | 7/2006 | Walker et al. | |
| 2006/0211493 A1 | 9/2006 | Walker et al. | |
| 2007/0015573 A1 | 1/2007 | Angell et al. | |
| 2007/0167209 A1 | 7/2007 | Jaffe et al. | |
| 2007/0259714 A1 | 11/2007 | Block et al. | |
| 2011/0077073 A1 | 3/2011 | Gagner et al. | |
| 2011/0201408 A1 | 8/2011 | Gagner et al. | |
| 2011/0245943 A1 | 10/2011 | Agarwal et al. | |
| 2012/0190437 A1 | 7/2012 | Agarwal et al. | |
| 2013/0225273 A1 | 8/2013 | Gagner et al. | |
| 2013/0296027 A1 | 11/2013 | Gagner et al. | |
| 2014/0295951 A1 | 10/2014 | Gagner et al. | |

FOREIGN PATENT DOCUMENTS

| | | |
|---|---|---|
| JP | 200245557 | 2/2002 |
| JP | 2002210186 | 7/2002 |
| JP | 2005118431 | 5/2005 |
| JP | 200687714 | 4/2006 |
| JP | 2006116244 | 5/2006 |

(56) References Cited

FOREIGN PATENT DOCUMENTS

| WO | WO-9530944 | 11/1995 |
|---|---|---|
| WO | WO-8906998 | 8/1998 |
| WO | WO-0176710 | 10/2001 |
| WO | WO-03045517 | 5/2003 |
| WO | WO-2007107883 | 9/2007 |
| WO | WO-2008058279 | 5/2008 |
| WO | WO-2009137633 | 11/2009 |
| WO | WO-2010054027 | 5/2010 |

OTHER PUBLICATIONS

U.S. Appl. No. 13/858,467, filed Apr. 8, 2013, Gagner, Mark B., et al.
"19- Touchscreen Multi-Game Terminal Supergold Bingo Play Description", *POT-O-GOLD* before Aug. 31, 2007, 2 pages.
"19 Touchscreen Multi-Game Terminal Superpick Lotto Play Description", *POT-O-GOLD* before Aug. 31, 2007, 2 pages.
"19 Touchscreen Multi-Game Terminal Touch 6 Lotto Play Description", *POT-O-GOLD* before Aug. 31, 2007, 2 pages.
"19 Touchscreen Multi-Game Terminal Touch 6 Lotto Technical Description", POT-O-GOLD before Aug. 31, 2007, 1 page.
"19 Touchscreen Multi-Game Terminal Toucheasy Keno Play Description", POT-O-GOLD before 08-31-200, 2 pages.
"Amendment in the Nature of a Substitute H.R. 3125, Offered by Mr. Goodlatte of Virginia", *Tech Law Journal* www.techlawjournal.com Date obtained from the Internet Dec. 20, 2005 Apr. 5, 2000, 3 pages.
"*AT&T Corp. v. Coeur D'Alene Tribe*, 45 F. Supp. 2d 995 (D. Idaho 1998)", 1998, 14 pages.
"Bill HR 3125 IH The Internet Gambling Prohibition Art Oct. 21, 1999", 17 pages.
"Casino Systems Solutions", *IGT International Game Technology* Mar. 19, 1997, 20 pages.
"CDS Video Slant Top", *Casino Data Systems* before Aug. 31, 2007, 6 pages.
"Examination Report", Sep. 17, 2009, 3 pages.
"H.R. 3125, 106th Congress, 2d Session", *Internet Prohibition Act of 2000* http://thomas.loc.gov Date obtained from the Internet: Nov. 23, 2005 Oct. 21, 1999, 9 pages.
"High-Tech Gambling Debuts at Turning Stone", *Syracuse Post Standard* Feb. 27, 1995, 1 page.
"Oasis II", *CDS Systems and Services* before Aug. 31, 2007, 8 pages.
"PCT Application No. PCT/US09/43055 International Preliminary Report on Patentability", Jun. 21, 2010, 14 pages.
"PCT Application No. PCT/US09/43055 International Search Report", Jun. 22, 2009, 10 pages.
"PCT Application No. PCT/US09/63321 International Preliminary Report on Patentability", Oct. 5, 2010, 9 pages.
"PCT Application No. PCT/US09/63321 International Search Report", Dec. 29, 2009, 8 pages.
"PCT Application No. PCT/US2007/084316 International Preliminary Report on Patentability", Jan. 13, 2009, 8 pages.
"PCT Application No. PCT/US2007/084316 International Search Report and Written Opinion", May 23, 2008, 10 pages.
"S. 692, 106th Congress, 1st Session", *Internet Gambling Prohibition Act of 1999* before Aug. 31, 2007, 8 pages.
"Singapore Application 0800336-0 IPO of Singapore Written Opinion", Feb. 25, 2009, 7 pages.
"The Future of Gaming Today", *Casino Data Systems* before Aug. 31, 2007, 6 pages.
"U.S. Appl. No. 11/483,558 Office Action", Jun. 24, 2009, 9 pages.
"U.S. Appl. No. 12/513,486 Office Action", Oct. 11, 2012, 13 pages.
"U.S. Appl. No. 12/513,486 Office Action", Feb. 23, 2012, 36 pages.
"U.S. Appl. No. 12/991,391 Office Action", Mar. 12, 2012, 29 pages.
Banks, Michael A. , "America Online: A Graphics-Based Success", *LINK-UP* Jan./Feb. 1992, pp. 12, 14 and 15.
Conti, Carl , "Letter to Bruce T. Samboy", Jun. 27, 1994, 2 pages.
Corbisiero, Jr., Richard F. , "Letter to Niels C. Holch", Jul. 14, 1994, 1 page.
Gatley, Susan , "Turning Stone Inter-Office Memorandum to Bong Woo", re Instant Keno Issues Oct. 17, 1994, 3 pages.
Green, Marian , "Cashing in", *Indian Gaming Business* Fall 2006, 21-23.
Grochowski, John , "The Cashless Puzzle", *Slot Manager* Jan./Feb. 2008, 5 pages.
Holch, Niels C. , "Letter to Hon. Richard F. Corbisiero, Jr.", Jul. 12, 1994, 1 page.
Imagineering Systems, Inc., , "Instant Keno—Cashless Automated Keno Writer Stations", before Aug. 31, 2007, 7 pages.
Imagineering Systems, Inc., , "Instant Keno Specification", multiple drafts captioned "Keno" and "Instant Keno," before Aug. 31, 2007, 38 pages.
Imagineering Systems, Inc., , "The Keno People", before Aug. 31, 2007, 2 pages.
Mikohn Worldwide, , "A Revolution for Table Games", *SafeJack* before Aug. 31, 2007, 15 pages.
Mikohn Worldwide, , "CasinoLink System", before Aug. 31, 2007, 8 pages.
Mikohn Worldwide, , "What is Casinolink", *Casinolink* before Aug. 31, 2007, 4 pages.
Minder, Jacqueline L. , "Letter to Ron Mach", Jun. 20, 1994, 1 page.
Monteau, Harold , "Letter to Richard M. Milanovich", *National Indiam Gaming Commission* Jun. 6, 1995, 2 pages.
Monteau, Harold A. , "Semiannual Regulatory Agenda", *National Gaming Indian Commission* Obtained from the Internet: before Feb. 26, 2007, 1 page.
Quick Track Gaming, Inc., , "QuickTrack", before Mar. 18, 1997, 44 pages.
Samboy, Bruce T. , "Letter to Carl Conti", Jun. 13, 1994, 2 pages.
Samboy, Bruce T. , "Letter to Carl Conti", Jul. 1, 1994, 2 pages.
Samboy, Bruce T. , "Letter to Hon. Richard F. Corbisiero, Jr.", Jun. 1, 1994 , 7 pages.
Samboy, Bruce T. , "Letter to Hon. Richard F. Corbisiero, Jr.", Jun. 14, 1994, 8 pages.
Smith, Katherine A. , "Letter to Hon. James R. Hurley", Jun. 15, 1994, 4 pages.
Washburn, Kevin K. , "WIN Sports Betting", Mar. 13, 2001, 3 pages.
Yerak, Becky , "At Cashless Slots: You've got mail, and a jackpot No more coins to insert, but you can get messages", *USA Today* Nov. 13, 2000, 4 pages.
U.S. Appl. No. 13/926,869, filed Jun. 25, 2013, Gagner, Mark B., et al.
"U.S. Appl. No. 13/858,467 Office Action", Dec. 30, 2013, 6 Pages.
"U.S. Appl. No. 14/305,947 Office Action", Aug. 29, 2014, 9 Pages.
Co-pending U.S. Appl. No. 14/305,947, filed Jun. 17, 2014, 55 pages.

\* cited by examiner 802 804

ACCOUNT RULES

[ ADD NEW RULE ]

| ACTION | AMOUNT | SOURCE ACCOUNT | DESTINATION ACCOUNT | TRIGGER | |
|---|---|---|---|---|---|
| TRANSFER | $200.00 | CHECKING ACCOUNT | CASINO ACCOUNT | EVERY DAY AT 12:00 AM | 806 / 808 |
| TRANSFER | 1% | GAME SESSION ACCOUNT | CHARITY ACCOUNT | UPON CASH-OUT EVENT | 810 |
| TRANSFER | $100.00 | CASINO ACCOUNT | MONEY MARKET | SOURCE ACCOUNT > $200.00 | 812 |
| LOCK | | CASINO ACCOUNT | | SOURCE ACCOUNT HAS REDUCED BY 50% IN LESS THAN AN HOUR | 814 |
| LOCK | | CASINO AND MONEY MARKET ACCTS | | EVERY DAY BETWEEN 3:00AM AND 7:00AM | 816 |
| RECEIVE ONLY | | MONEY MARKET ACCOUNT | | ALWAYS | 818 |

FIG. 8

WAGERING GAME ACCOUNT MANAGEMENT SYSTEM

RELATED APPLICATIONS

This application claims priority to, and is a continuation application of, U.S. application Ser. No. 12/513,486, filed on May 4, 2009. The Ser. No. 12/513,486 application is a continuation application and claims priority benefit of PCT Application No. PCT/US07/08431, filed on Nov. 9, 2007, which claims the priority benefit of U.S. Provisional Application No. 60/865,057 filed Nov. 9, 2006.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, WMS Gaming, Inc.

FIELD

Embodiments of the inventive subject matter relate generally to wagering game systems, and more particularly to wagering game account management systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

In some embodiments, each of the one or more game session accounts is associated with a different wagering game, and wherein each different wagering game is presented in the GUI at the same time.

In some embodiments, each of the one or more game session accounts is associated with a different wagering game, and the instructions further include instructions to determine, based on the one or more game session accounts, which of the different wagering games has awarded the most money; and instructions to present a message in the GUI indicating the one of the different wagering games has awarded the most money.

In some embodiments, the graphical representation of transaction options includes icons, and wherein the input indicates drag-and-drop operations involving the icons and the graphical representation of the wagering game account.

In some embodiments, the instructions further are comprising instructions to transmit the request to perform a transaction; and instructions to present an indication that the transaction was successfully completed.

In some embodiments, the wagering game account includes monetary value available for use in placing a wager on a wagering game.

In some embodiments, the other accounts include one or more of a checking account, savings account, charity account, and education account.

A method comprising determining that a trigger condition for an account rule has occurred, wherein the account rule specifies an account action to be performed upon satisfaction of the trigger condition, and wherein the account action is associated with a wagering game account and other financial accounts; initiating the account actions; and indicating a result of the account actions.

In some embodiments, the wagering game account includes monetary value available as credits on a wagering game machine.

In some embodiments, the account actions prohibit some financial transactions for a specified duration.

In some embodiments, the account actions specify a financial transaction involving the wagering game account and one or more of the other financial accounts.

In some embodiments, the initiating account actions includes contacting a financial institution computer associated with one or more of the other financial accounts.

In some embodiments, the trigger condition is based on results of a wagering game.

In some embodiments, the trigger condition is selected from the set of trigger conditions comprising a time, a balance of the wagering game account, a balance of one of the other financial accounts, and an amount wagered in a wagering game.

In some embodiments, the method is further comprising transmitting an indication of the account rule in a format suitable for presentation in a graphical user interface; detecting a request to modify the account rule, wherein the request indicates changes to at least one of the trigger condition and the account action; modifying the account rule based on the request.

A system comprising a wagering game machine including, an account manager configured to present a graphical user interface (GUI) including menus for creating an account rule, wherein the account rule specifies a financial transaction associated with a wagering game account and other financial accounts, and wherein the account rule specifies a condition that when satisfied will cause initiation of the financial transaction; an external system interface configured to transmit the account rule; and a wagering game unit configured to present wagering games; an account controller configured to receive the account rule and to initiate the financial transaction upon satisfaction of the condition.

In some embodiments, the account controller is further configured to detect when the financial transaction is complete and to transmit a notification that the financial transaction is complete to the wagering game machine.

In some embodiments, the wagering game account is associated with a game session, and wherein the balance of the wagering game account appears in a credit meter that is visible during the wagering games.

In some embodiments, the financial transaction is a transfer of funds between the wagering game account and one of the other financial accounts.

In some embodiments, the wagering game is further configured to notify the account manager about results of the wagering games, and wherein the condition is based on the results.

In some embodiments, the wagering game unit is further configured to use the wagering game account as a direct source of monetary value for wagers that are placed on the wagering games.

In some embodiments, the condition indicates an amount of winnings.

BRIEF DESCRIPTION OF THE FIGURES

The present invention is illustrated by way of example and not limitation in the Figures of the accompanying drawings in which:

FIG. 8 is a block diagram illustrating an account rules interface, according to example embodiments of the invention;

DESCRIPTION OF THE EMBODIMENTS

This description of the embodiments is divided into five sections. The first section provides an introduction to embodiments of the invention, while the second section describes wagering game machine architectures and wagering game networks. The third section describes interfaces and operations of by some embodiments and the fourth section describes example wagering game machines in more detail. The fifth section presents some general comments.

Introduction

This section provides an introduction to some embodiments of the invention.

Wagering game machines typically offer a limited number of ways for players to provide monetary value for use in wagering games. Some wagering game machines allow players to insert cash and cashless vouchers or to draw from casino accounts. However, wagering game machines typically do not offer many other ways to procure funds. As a result, when players run out of cash, cashless vouchers, and/or casino account funds, they often leave the casino floor to acquire additional funds. For example, players may go to automated teller machines, banks, or other institutions from which they can procure funds. Some embodiments of the invention enable players to acquire funds from a variety of sources without leaving a wagering game machine. Additionally, some embodiments enable players to specify conditions under which various account transactions will take place. For example, players can create account rules that automatically replenish depleted accounts, limit losses, donate a portion of winnings to charity, etc. The discussion of FIG. 1 describes some of these embodiments in more detail.

Figure 1:
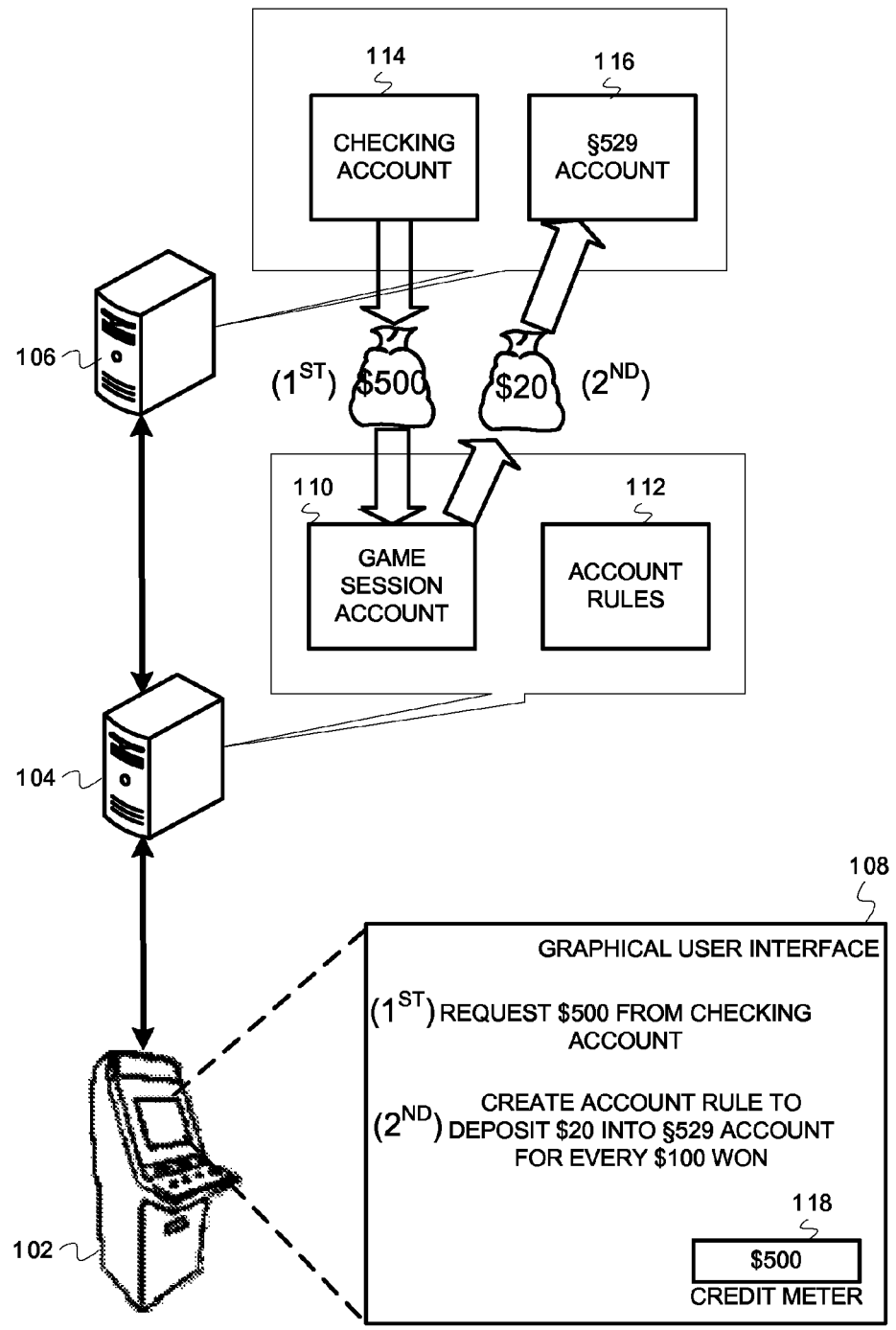
FIG. 1 is a block diagram illustrating account transactions, according to example embodiments of the invention.

FIG. 1 is a block diagram illustrating account transactions, according to example embodiments of the invention. In FIG. 1, a wagering game machine 102 is connected to an account controller 104, which is connected to a financial institution computer 106. The wagering game machine 102 provides a graphical user interface 108 through which players request account transactions and create account rules. The account server 104 facilitates the account transactions and enforces the account rules, while the financial institution computer 106 also facilitates account transactions.

FIG. 1 shows two transactions. In the first transaction (see "$1^{ST}$" in FIG. 1) a player (not shown) uses the interface 114 to request transfer of $500 from a checking account 114 to a game session account 110. After the wagering game machine 102 receives the player's request, the machine 102 notifies the account controller 104 about the request. As a result, the account controller 104 contacts the financial institution computer 106, which transfers $500 from the player's checking account 114 to the player's game session account 110. Funds in the game session account 110 appear on the wagering game machine's credit meter 118 and are available for use in wagering games presented on the wagering game machine 102.

In the second transaction (see "$2^{ND}$" in FIG. 1), the player configures an account rule in the user interface 108. The account rule prompts transfer of $20 from the player's game session account 110 to his §529 account 116 for every $100 won playing wagering games. For information about §529 accounts, see section 529 of the United States Code, which governs Qualified State Tuition Programs. The wagering game machine 102 notifies the account controller 104 about the account rule. The wagering game machine 102 also notifies the account controller 104 whenever the player wins money playing wagering games. When the player's winnings reach $100, the account controller 104 transfers $20 from the game session account 110 to the §529 account 116. The account controller 104 can support other account rules. In some embodiments, account rules can transfer a percentage of winnings from the game session account 110 to the §529 account 116. For example, if a player wins ten cents in a single game, twenty percent (two cents) is transferred into the §529 account 116.

Although FIG. 1 describes some embodiments, the following sections describe many other features and embodiments.

Example Operating Environment

This section describes an example operating environment and provides structural aspects of some embodiments. This section includes discussion about wagering game machine architectures and wagering game networks.

Wagering Game Machine Architecture

Figure 2:
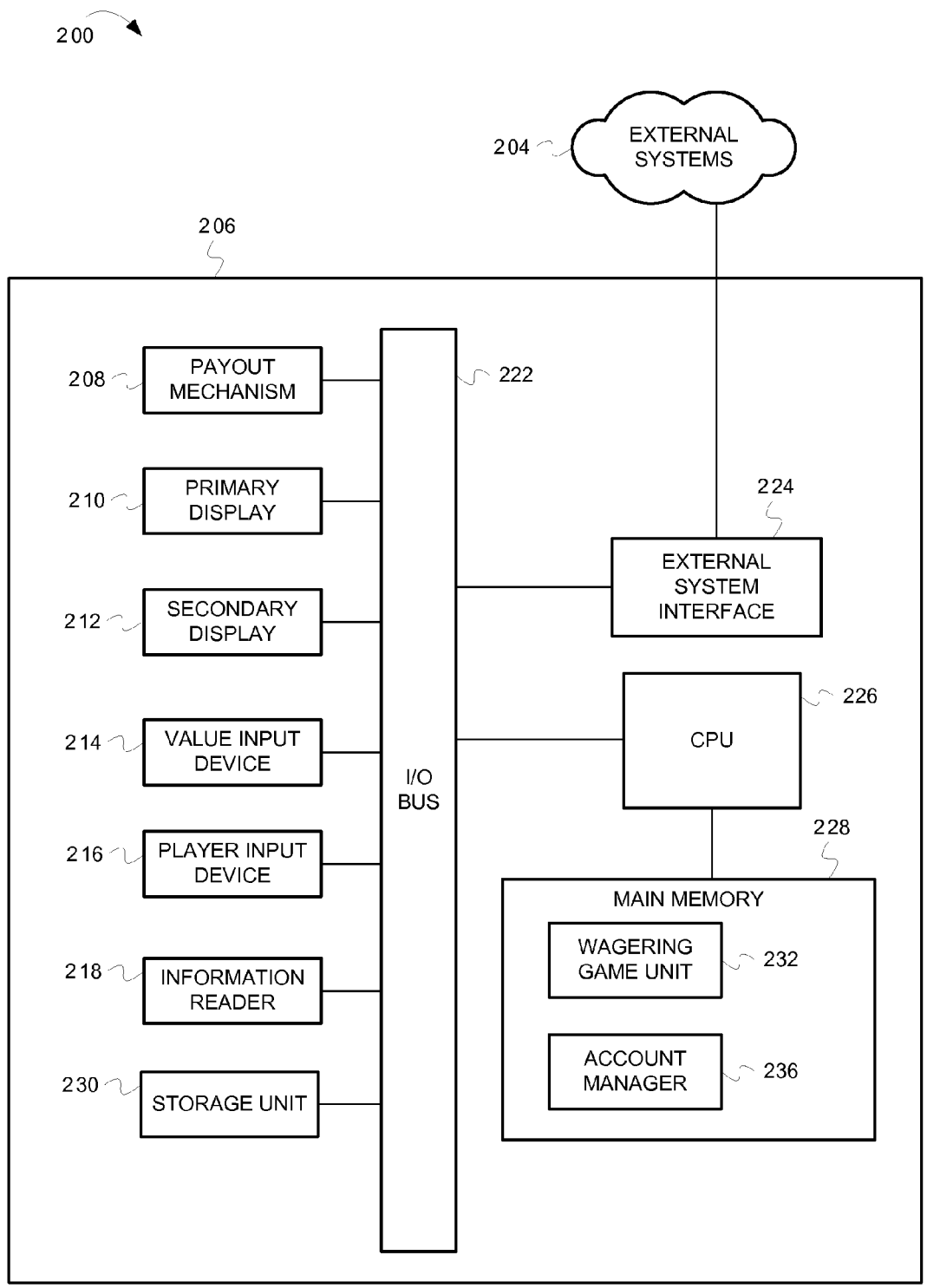
FIG. 2 is a block diagram illustrating a wagering game machine architecture, according to example embodiments of the invention.

FIG. 2 is a block diagram illustrating a wagering game machine architecture, according to example embodiments of the invention. As shown in FIG. 2, the wagering game machine architecture 200 includes a wagering game machine cabinet 206, which includes a central processing unit (CPU) 226 connected to main memory 228. The CPU 226 can include any suitable processor, such as an Intel® Pentium III processor, Intel® Core 2 Duo processor, AMD Opteron™ processor, UltraSPARC processor, etc. The main memory 228 includes a wagering game unit 232 and an account manager 236. In some embodiments, the wagering game unit 232 can present wagering games, such as video poker, video black jack, video slots, video lottery, etc., in whole or part. In some embodiments, the account manager 236 provides a user interface through which players can request account transactions and configure account rules. For example, players can request funds transfers between various accounts, such as game session accounts, checking accounts, savings accounts, §529 accounts, charity accounts, etc. The account rules can cause transfers and other transactions to occur when specific conditions are met. For example, account rules can initiate funds transfers when players wager specific amounts, win specific amounts, play a specific number of wagering games, etc.

The CPU 226 is also connected to an input/output (I/O) bus 222, which can include any suitable bus technologies, such as an AGTL+ frontside bus and a PCI backside bus. The I/O bus 222 is connected to a payout mechanism 208, primary display 210, secondary display 212, value input device 214, player input device 216, information reader 218, and storage unit 230. The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and/or multiple CPUs 226. In one embodiment, any of the components can be integrated or subdivided.

Any component of the architecture 200 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 3:
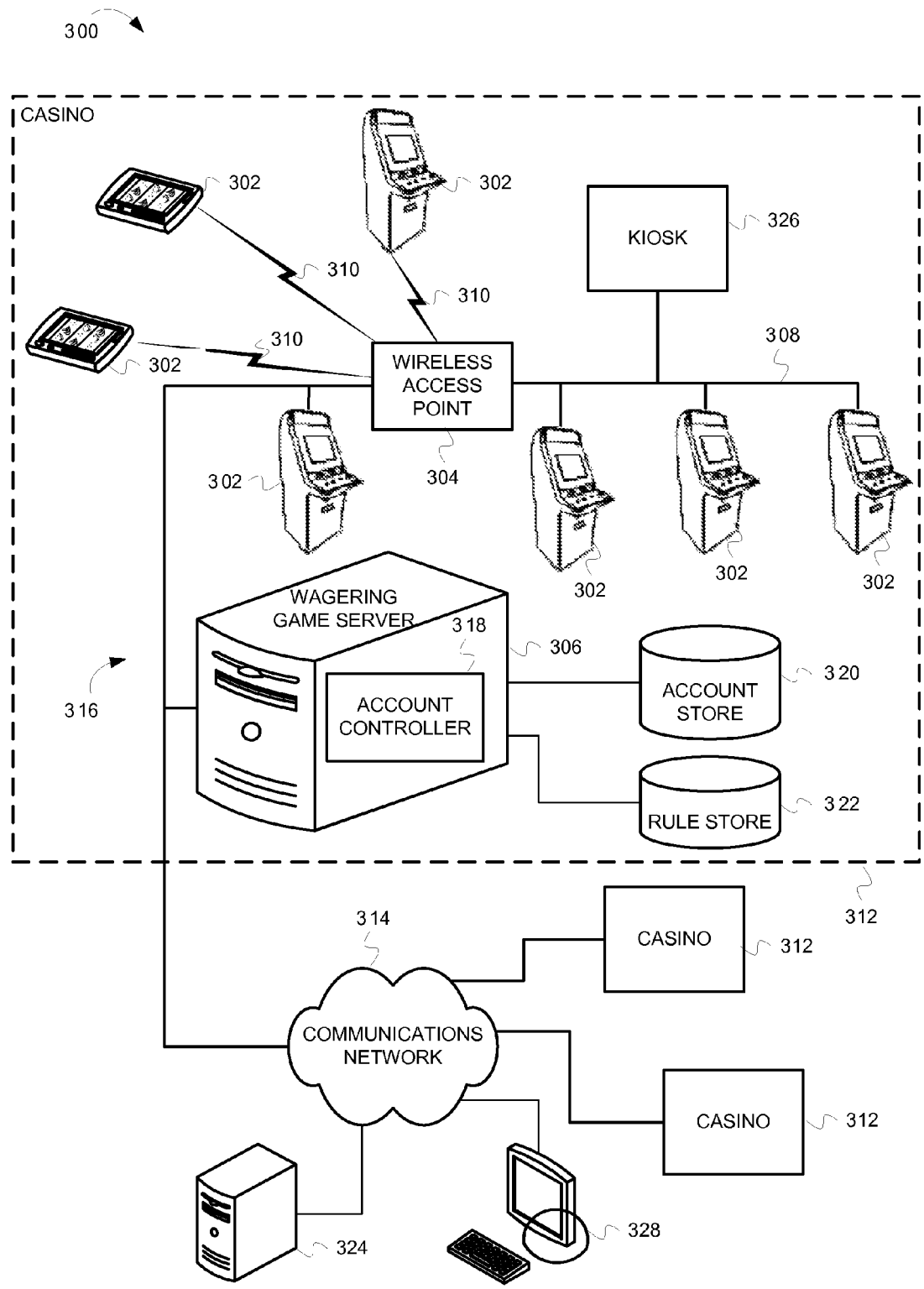
FIG. 3 is a block diagram illustrating a wagering game network 300, according to example embodiments of the invention.

While FIG. 2 describes example embodiments of a wagering game machine architecture, FIG. 3 shows how a plurality of wagering game machines can be connected in a wagering game network.

Wagering Game Network

FIG. 3 is a block diagram illustrating a wagering game network 300, according to example embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. The wagering game server 306 includes an account controller 318, which can facilitate account transactions and enforce account rules. The account controller 318 can communicate with other network components, such as the financial institution computer 324, when enforcing account rules and processing transactions. Also, the account controller 318 can record, modify, and use account information in the account store 320 and rule store 322. In some embodiments, the account controller 328, account store 320, and the rule store 322 can be located outside the casino 312.

The local area network 316 includes wireless communication links 310 and wired communication links 308. The wired and wireless communication links can employ any suitable connection technology, such as Bluetooth, 802.11, Ethernet, public switched telephone networks, SONET, USB, arcnet, current loop, etc. In one embodiment, the wagering game server 306 can serve wagering games and/or distribute content to devices located in other casinos 312 or at other locations on the communications network 314.

Any of the wagering game network components (e.g., the wagering game machines 302) can include hardware and machine-readable media including instructions for performing the operations described herein.

The wagering game machines 302 described herein can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account.

Similarly, functionality not directly related to game play may be controlled by the wagering game machine 302 (client) or the wagering game server 306 (server) in embodiments. For example, account transactions and account rules may be managed centrally (e.g., by the wagering game server 306) or locally (e.g., by the wagering game machine 302). Other functionality not directly related to game play may include power management, presentation of advertising, software or firmware updates, system quality or security checks, etc.

Operations and Interfaces

This section describes operations and interfaces associated with some embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel. Furthermore, the discussion below describes communications between wagering game network components. In some embodiments, the communications can include HyperText Transport Protocol (HTTP) requests for Hypertext Markup Language (HTML) documents. However, in other embodiments, the communications can be formatted according to different communication protocols.

Figure 4:
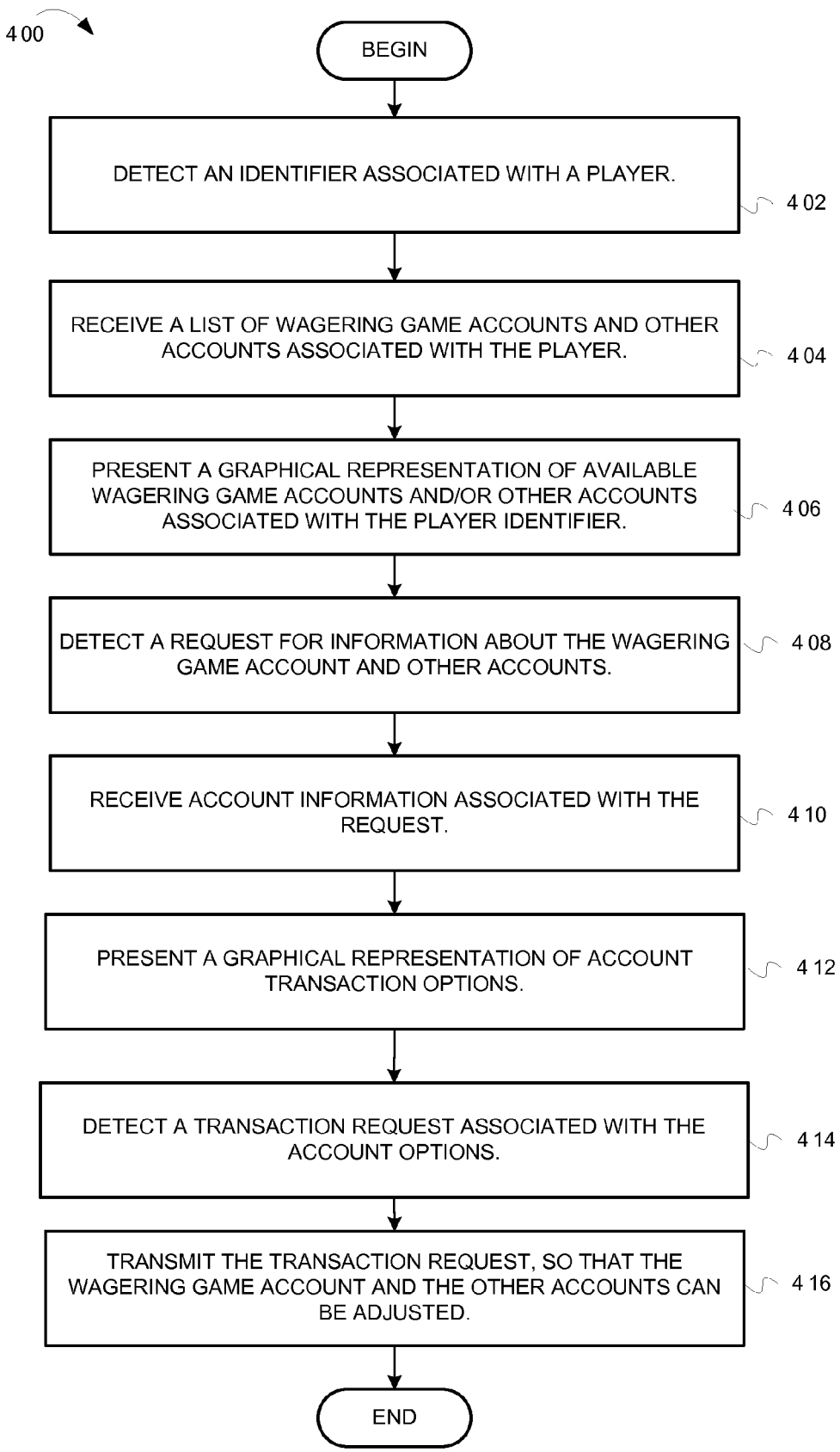
FIG. 4 is a flow diagram illustrating operations for facilitating account transactions on a wagering game machine through a user interface, according to example embodiments of the invention.
Figure 5A:
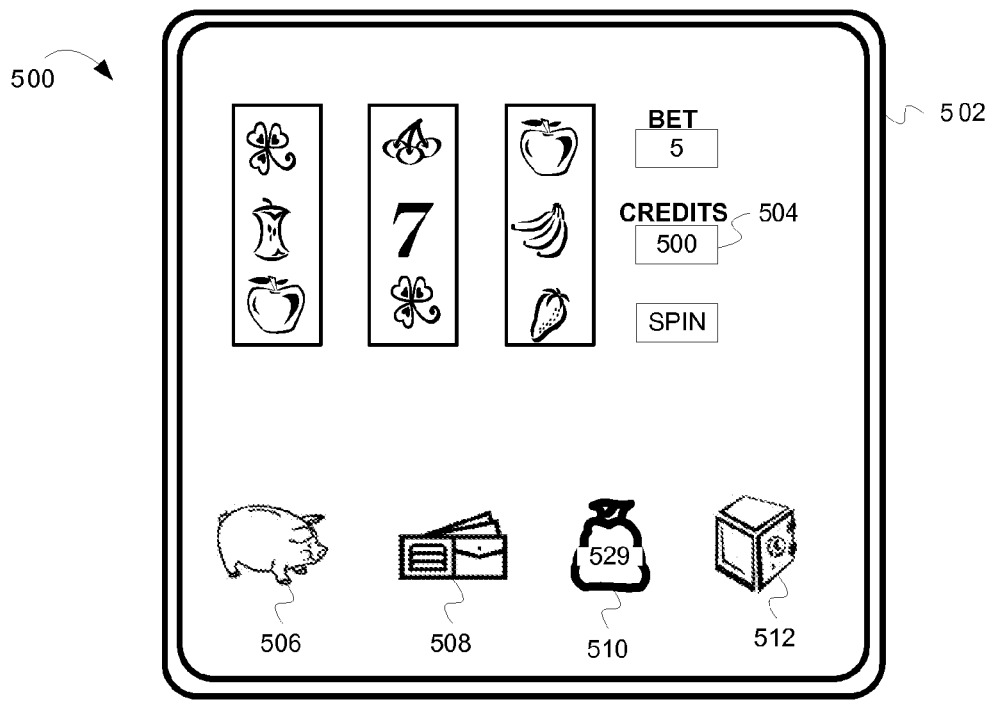
FIG. 5A is a block diagram illustrating a graphical user interface through which players can request account transactions from a wagering game machine, according to example embodiments of the invention.
Figure 5B:
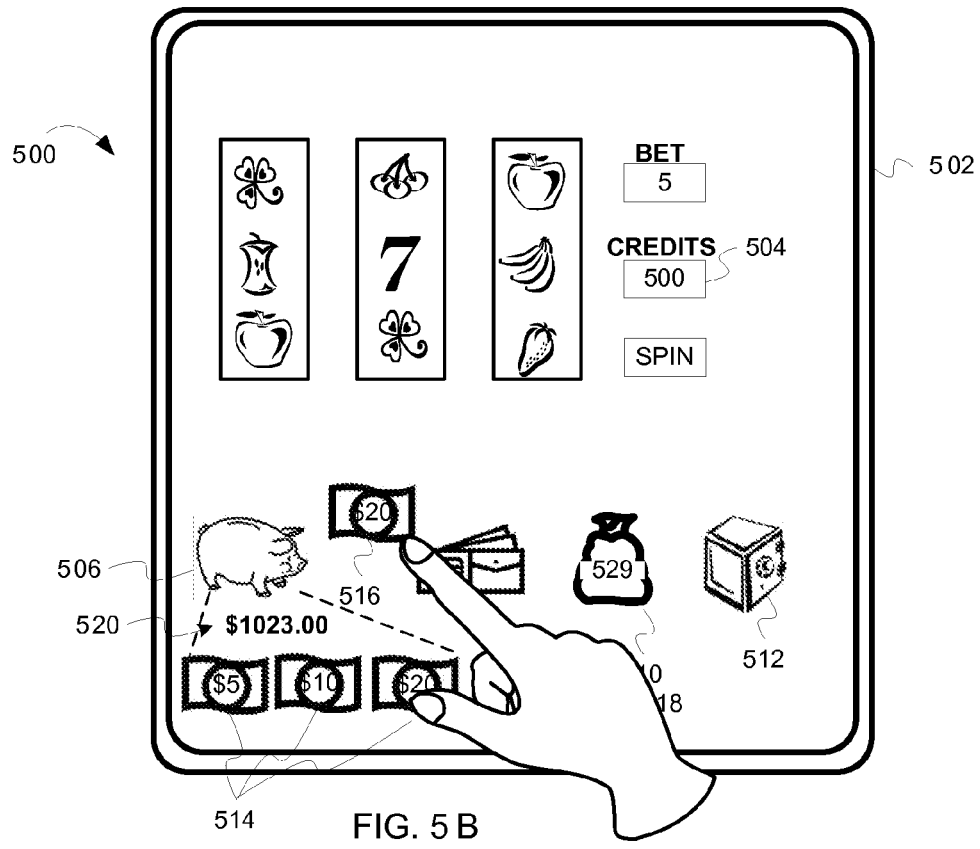
FIG. 5B is a block diagram illustrating account information in a wagering game machine's graphical user interface, according to example embodiments of the invention.
Figure 5C:
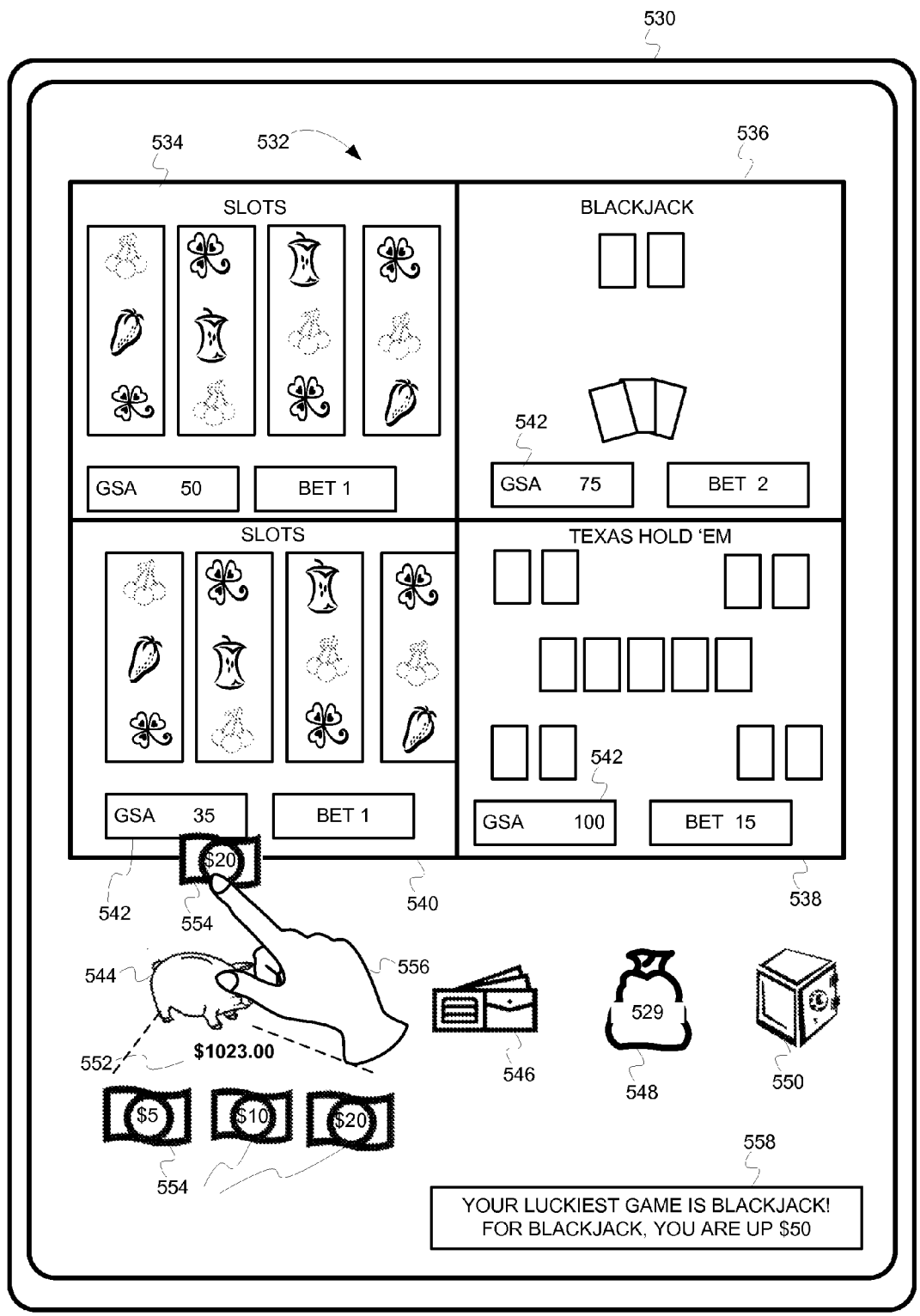
FIG. 5C is a block diagram illustrating an interface though which players can perform account transactions associated with a plurality of game session accounts, according to some embodiments of the invention.
Figure 6:
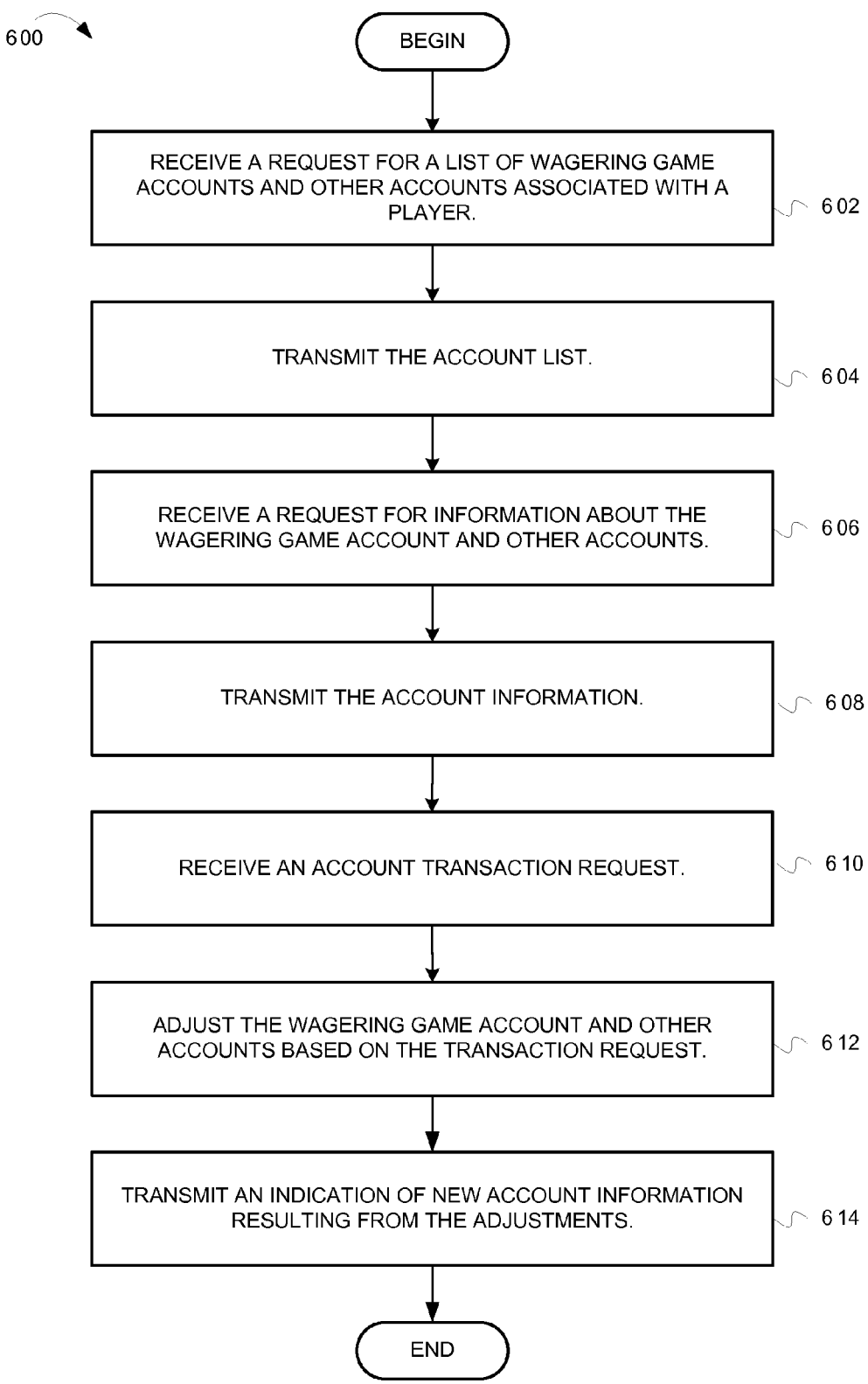
FIG. 6 is a flow diagram illustrating operations for processing account transactions made at a wagering game machine, according to example embodiments of the invention.

The section will discuss FIGS. 4-11. FIGS. 4-6 will describe operations and interfaces for performing account transactions in response to player input. The discussion of FIGS. 7-11 will describe operations and interfaces for configuring account rules and performing account transactions based on the account rules.

Account Transactions

FIG. 4 is a flow diagram illustrating operations for facilitating account transactions on a wagering game machine through a user interface, according to example embodiments of the invention. The flow diagram 400 will be described with reference to the FIG. 3's wagering game network and FIG. 2's wagering game architecture. The flow begins at block 402.

At block 402, a wagering game machine 302 detects a player identifier. The wagering game machine 302 may detect the player identifier as a result of a player swiping a player account card, manually entering the identifier, or providing some other device that indicates the player identifier (e.g., an RFID tag). The flow continues at block 404.

At block 404, the wagering game machine 302 receives a list of wagering game accounts and other accounts associated with the player identifier. In some embodiments, the wagering game machine's account manager 236 requests and receives the list from the account controller 318. The flow continues at block 406.

At block 406, the wagering game machine 302 presents a graphical representation of the wagering game accounts and/or other accounts enumerated in the list. For example, the wagering game machine's account manager 236 presents, on the primary display 210, a user interface including graphics that represent financial accounts associated with the player identifier. FIG. 5A shows one such user interface.

FIG. 5A is a block diagram illustrating a graphical user interface through which players can request account transactions from a wagering game machine, according to example embodiments of the invention. In FIG. 5A, the graphical user interface 500 appears on a wagering game machine's touchscreen 502. As shown, the user interface 500 includes graphics representing accounts associated with a player identifier. The graphics include a game session account icon 504, savings account icon 506, casino account icon 508, §529 account icon 510, and money market account icon 512. The GUI 500 can show icons for any number of financial accounts. The accounts can include a game session account, casino debit/credit accounts, checking accounts, savings accounts, educational savings accounts (e.g., a §529 account), charity accounts (e.g., accounts that aid responsible gaming programs), holiday savings accounts, etc. According to embodiments, players can request account transactions by interacting with the icons.

Referring back to FIG. 4, the flow continues at block 408.

At block 408, the wagering game machine 302 detects a request for information about the wagering game account and/or other accounts. For example, the account manager 236 detects that a player has activated an icon in the user interface. The flow continues at block 410.

At block 410, the wagering game machine 302 receives account information associated with the account access request. The account information can include an account balance, transaction options associated with the account, and other information related to the account. In some embodiments, the account manager 236 requests and receives the account information from the account controller 318. Flow continues at block 412.

At block 412, the wagering game machine presents a graphical representation of the account information. To illustrate this concept, FIG. 5B shows how some embodiments can present account information including transaction options in a GUI.

FIG. 5B is a block diagram illustrating account information in a wagering game machine's graphical user interface, according to example embodiments of the invention. Players can activate the account icons by pressing the touchscreen 502. After an account icon is activated, the interface 500 presents additional account transaction options, which are represented by additional icons. In FIG. 5B, the player 518 has activated the savings account icon 506. As a result, the interface 500 has presented a savings account balance 520 and currency icons 514, which allow the player 518 to transfer different denominations between a savings account and other accounts. As shown, the player 518 is dragging a $20 currency icon 516 into the game session account icon 504. This drag-and-drop operation constitutes a request to transfer $20 from the player's savings account into the player's game session account. The GUI 500 supports similar drag-and-drop operations to request other transfers. In some gaming jurisdictions, gaming regulations require that players first transfer monies into casino accounts before transferring those monies into game session accounts. The interface 500 can be configured to enforce/comply with gaming regulations, while also facilitating the account transactions described herein.

Referring back to FIG. 4, the flow continues at block 414.

At block 414, the wagering game machine 302 detects a transaction associated with the account options. For example, the account manager 236 detects a drag-and-drop operation that signifies an account transaction request. The drag-and-drop operations can indicate all parameters needed to request an account transaction. For example, drag-and-drop operations can indicate a transaction type, source account, destination account, currency amount, etc. The flow continues at block 416.

At block 416, the wagering game machine 302 transmits an indication of the transaction request, so the wagering game account and/or other accounts can be adjusted. For example, the account unit 236 transmits, to the account controller 318, an indication of the transactions that the player requested via the user interface. From block 416, the flow ends.

Although not explicitly described above, the account configuration operations and features work for wagering game machines that can present multiple wagering games simultaneously. FIG. 5C illustrates this concept. FIG. 5C is a block diagram illustrating an interface though which players can perform account transactions associated with a plurality of game session accounts, according to some embodiments of the invention. In FIG. 5C, a touch screen 530 includes an interface 532 that is divided into four sections 534, 536, 538, and 540. The interface 532 includes a slots game in section 534, blackjack in section 536, slots in section 538, and Texas Hold 'Em in section 540. Each game is associated with a separate game session account and a separate game session account indicator 542. Some embodiments of the invention enable players to transfer funds between separate game session accounts and other accounts.

In FIG. 5C, the interface 532 includes a checking account icon 544, casino account icon 546, §529 account icon 548, and savings account icon 550. The interface also includes a checking account balance indicator 552 and currency icons 554, which allow the player 556 to transfer different denominations between a savings account and other accounts. As shown, the player 556 is dragging a $20 currency icon 554 into the game session account icon 542. This drag-and-drop operation constitutes a request to transfer $20 from the player's savings account into one of the player's game session accounts. The player 556 can transfer monies into any of the separate game session accounts by performing similar drag-and-drop operations. In some gaming jurisdictions, gaming regulations require that players first transfer monies into casino accounts before transferring those monies into game session accounts. The interface 532 can be configured to enforce/comply with gaming regulations, while also facilitating the account transactions described herein.

Embodiments that support separate game session accounts can include logic for evaluating a player's performance at multiple games. For example, a wagering game machine's account manager 236 can use the separate game session accounts to determine: hold percentages associated with each game, games accumulating most winnings, games having most losses, etc. The account manager 236 can present this information in the interface 500. For example, in FIG. 5C, the account manager 236 has presented a message 558 stating, "Your Luckiest Game is Blackjack! For Blackjack, You Are Up $50."

Embodiments that support separate game session accounts can also enable players to play games in the background. For example, a player can select a Keno game and transfer $100 into a game session account associated with the Keno game. The player can configure the Keno game to play until the game session account has a zero balance. If the player does not withdraw from the Keno game before the account has a zero balance, the player's losses will be limited to the $100 transferred to the game session account.

Thus far, this section has described account operations typically performed by wagering game machines. This section will continue with a discussion about account operations that are typically performed by account controllers.

FIG. 6 is a flow diagram illustrating operations for processing account transactions made at a wagering game machine, according to example embodiments of the invention. The flow 600 describes operations by which an account controller transmits information to wagering game machines. In some embodiments, the wagering game machines include logic for presenting the information (e.g., see discussion of FIG. 4). In other embodiments (e.g., where the wagering game machine includes a thin client) the account controller can control presentation of the information on the wagering game machines. The flow 600 begins at block 602.

At block 602, the account controller 318 receives (from a wagering game machine 302) a request for a list of wagering game accounts and other financial accounts associated with a player. The flow continues at block 604.

At block 604, the account controller 318 transmits the account list to the wagering game machine 302. As noted above, in some embodiments, the account controller 318 may control presentation of the account list on the wagering game machine 302. The flow continues at block 606.

At block 606, the account controller 318 receives a request for information about the wagering game account and other accounts. For example, the request may ask for account balances, transaction options, information about recent transactions, etc. The flow continues at block 608.

At block 608, the account controller 318 transmits the account information to the wagering game machine 302. The flow continues at block 610.

At block 610, the account controller 318 receives an account transaction request from the wagering game machine 302. For example, the account controller 318 receives a request to transfer funds from the player's savings account to the player's game session account. The flow continues at block 612.

At block 612, the account controller 318 adjusts the accounts based on the transaction request. For example, the account controller 318 instructs the financial institution computer 324 to deliver funds from a savings account to a game session account. In some embodiments, the account controller 318 does not transfer funds directly into game session accounts. Instead, the account controller 318 deposits funds into other wagering game accounts. Later, the account controller 318 can transfer funds from the wagering game accounts to game session accounts, if needed. The flow continues at block 614.

At block 614, the account controller 318 provides account information indicating the results of the requested transactions. For example, the account controller 318 notifies the player that funds have been transferred between the player's savings account and game session account. The account controller 318 can notify the player by sending a message to the wagering game machine 302. In some embodiments, the wagering game machine 302 will update its credit meter or other related balances accordingly. From block 614, the flow ends.

Account Rules

This section continues with a discussion of account rules. Some embodiments enable players to submit rules that automatically initiate account transactions when certain conditions are met. In some embodiments, the account rules specify account transactions, source and destination accounts, amounts, and trigger conditions. The account transactions can include transfers, deposits, withdrawals credits, debits, etc. When appropriate, source and destination accounts are identified (e.g., for transfers). Trigger conditions indicate when rules should be enforced. Trigger conditions can relate to time, account balances, wagering game results, wagers placed, and any other statistic associated with wagering game accounts, other financial accounts, and wagering games.

In some embodiments, players can use account rules to limit losses. For example, a player can create account rules that limit how much money can be transferred from a checking account into a game session account. Alternatively, players can move a portion of each winning jackpot from a game session account into savings account, where the savings account does not support wagering-game-related withdrawals. Players can also create account rules that transfer percentages of winnings to fund savings plans, charities, and other programs (e.g., responsible gambling programs). Furthermore, in some embodiments, players can create account rules that, at the conclusion of a gaming session, automatically transfer the entire game session account balance to another account, such as a casino debit account, checking account, or the like. As a result, embodiments eliminate the need for wagering game machines to return cash or cashless vouchers at the end of gaming sessions.

The following discussion will describe account rules in more details. In particular, the discussion of FIG. 7 will describe operations for presenting an account rule interface, while the discussion of FIGS. 8 & 9 will describe account rule interfaces. The discussion of FIGS. 10 & 11 will cover operations for creating and enforcing account rules.

Figure 7:
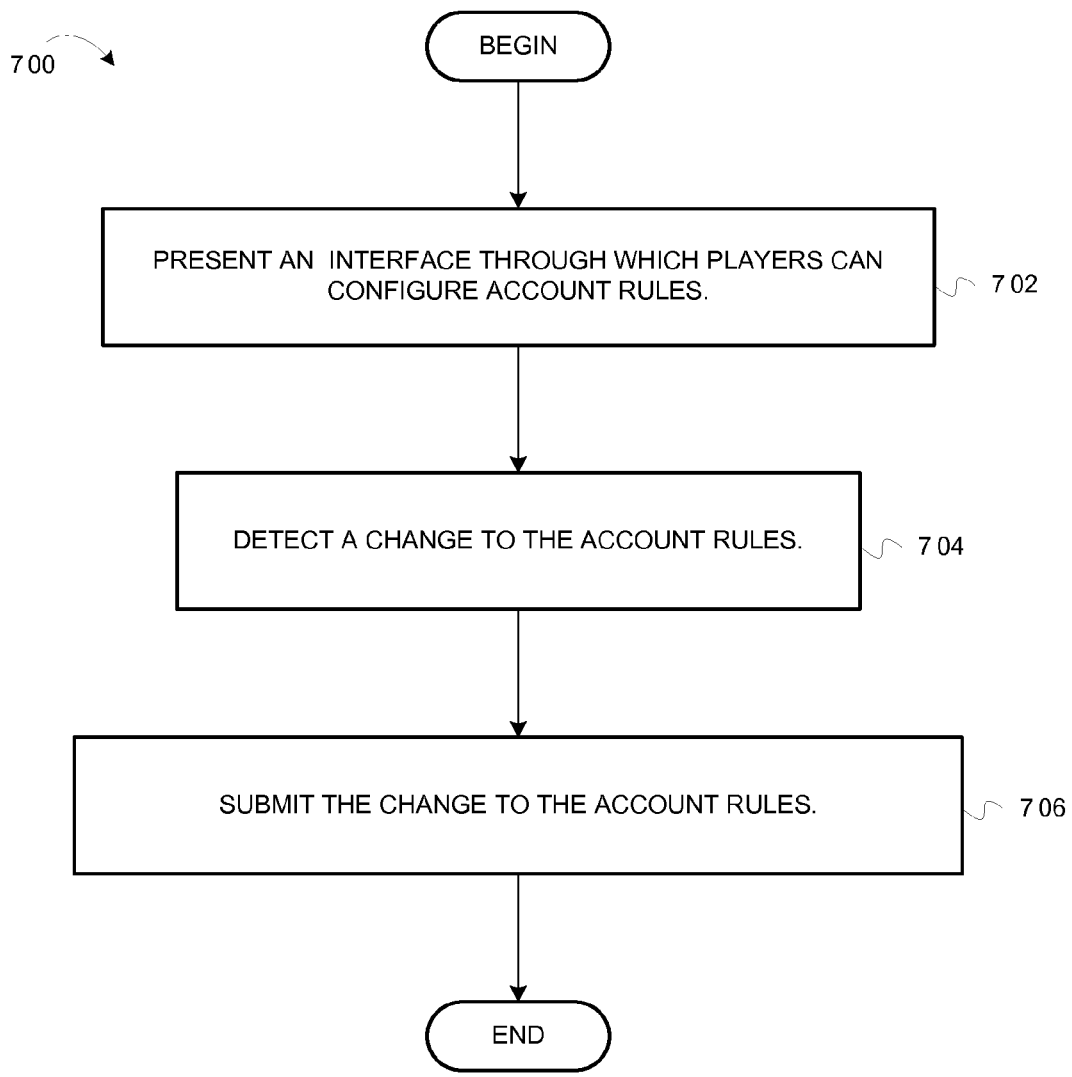
FIG. 7 is a flow diagram illustrating operations for presenting an account rule interface, according to example embodiments of the invention.

FIG. 7 is a flow diagram illustrating operations for presenting an account rule interface, according to example embodiments of the invention. The flow 700 begins at block 702.

At block 702, a wagering game machine 302 presents an interface through which players can view and configure account rules. In some embodiments, the account manager 236 and/or other components create the account rule interface and populate it with account information received from the account controller 318. In other embodiments, the machine 302 renders the account interface in a web browser, using information received from the account controller 318 or other network devices. FIG. 8 shows one embodiment of an account rules interface.

FIG. 8 is a block diagram illustrating an account rules interface, according to example embodiments of the invention. In FIG. 8, the account rules interface 802 shows account rules currently affecting a player's financial accounts. The account rules interface 802 is divided into rows, where the rows show parameters for each account rule. The parameters for each account rule (shown in row 806) include "ACTION", "AMOUNT", "SOURCE ACCOUNT", "DESTINATION ACCOUNT", and "TRIGGER". For example, the row 808 shows an account rule that transfers $200 from the player's checking account to the player's casino account every day at 12:00 am. Another rule, shown in row 812, transfers $100 from the player's casino account to the player's money market account when the casino account is greater than $200. In addition to showing the account rules, the account rules interface 802 includes a button 804 that can bring-up an interface for adding new rules. Although FIG. 8 shows an account rules interface in which players select from a predetermined parameter values, other embodiments enable players to create account rules by entering text (i.e., without a predetermined parameters) or by any other suitable method.

Referring back to FIG. 7, the flow continues at block 704.

Figure 9:
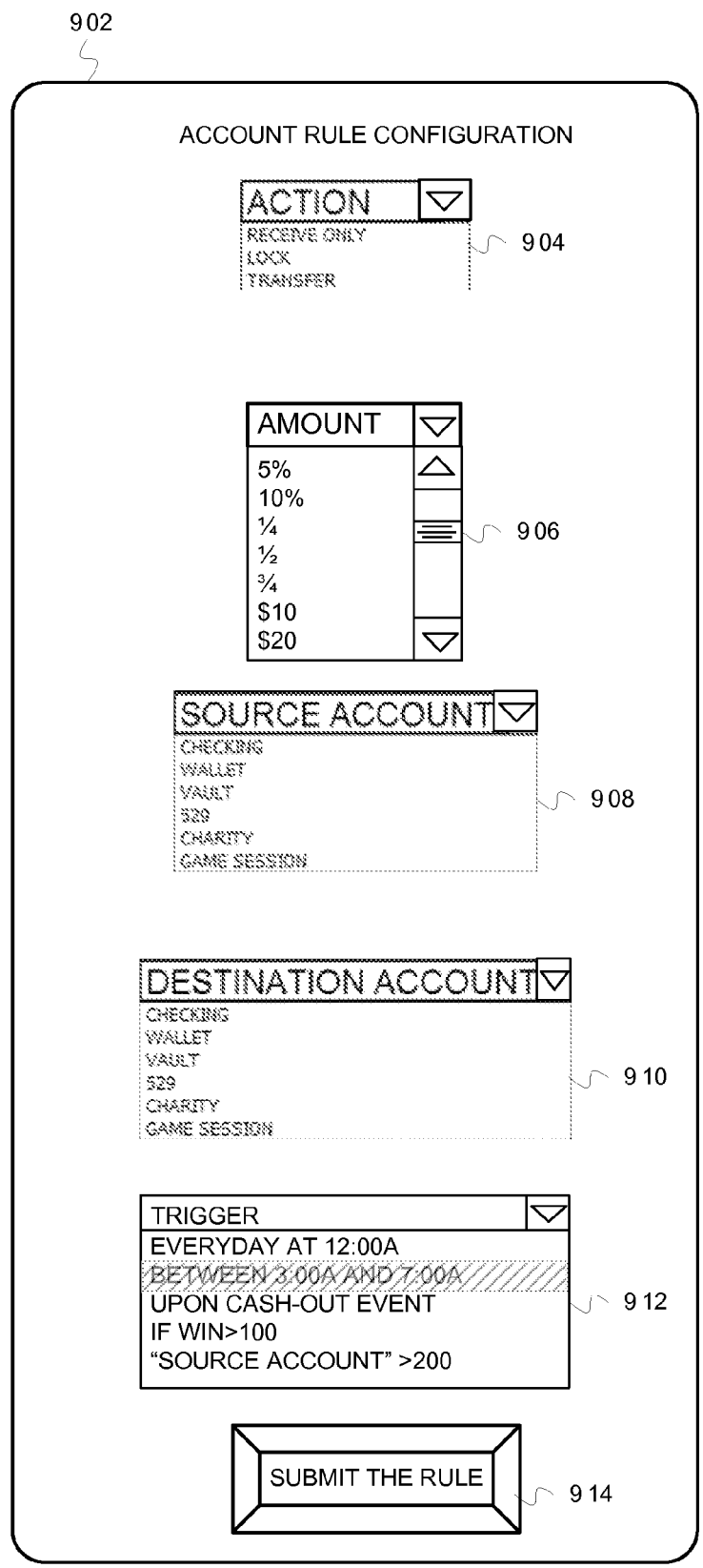
FIG. 9 is a block diagram illustrating an interface for configuring account rules, according to example embodiments of the invention.

At block 704, the wagering game machine 302 detects a change to the account rules. For example, the wagering game machine 302 detects that a player has attempted to create new rules or modify existing rules. In some embodiments, players can create and modify rules as follows. In the embodiment of FIG. 8, players can modify existing rules by activating a particular row in the interface 802 or by activating the button 804. After the player activates a row or the button 804, the wagering game machine 302 brings-up an interface for creating and modifying account rules. FIG. 9 shows one such interface.

FIG. 9 is a block diagram illustrating an interface for creating and modifying account rules, according to example embodiments of the invention. In FIG. 9, the account rules interface 902 includes drop-down menus for configuring account rule parameters. In particular, the interface 902 includes an ACTION menu 904, AMOUNT menu 906, SOURCE ACCOUNT menu 908, DESTINATION ACCOUNT menu 910, and a TRIGGER menu 912. Players can configure account rule parameters by selecting values from the menus 904-912. In some embodiments, when an existing rule is being modified, the menus 904-912 show the current parameter values.

Referring back to FIG. 7, the flow continues at block 706.

At block 706, the wagering game machine 302 submits the change to the account rules. Referring to FIG. 9, after a player has selected account rule parameters in the menus 904-912, the player can press the button 914 to submit the account rule for inclusion in the player's rule set. In some embodiments, the wagering game machine 302 submits the change by transmitting an indication of the change to the account controller 318. From block 706, the flow ends.

Although wagering game machines can perform the operations of the flow 700, in some embodiments, other devices perform those operations. For example, in a casino, players can use the kiosk 326 to view, create, and modify their account rules. From outside the casino, players can view, create, and modify account rules using the workstation 328, which in some embodiments can communicate with the account controller 318 over the world wide wed and/or the Internet. Account controllers can also play a role in the process with which players view, create, and modify account rules. This section continues with a discussion about how account servers can interact with a wagering game machine, kiosks, and workstations to process and store account rules.

Figure 10:
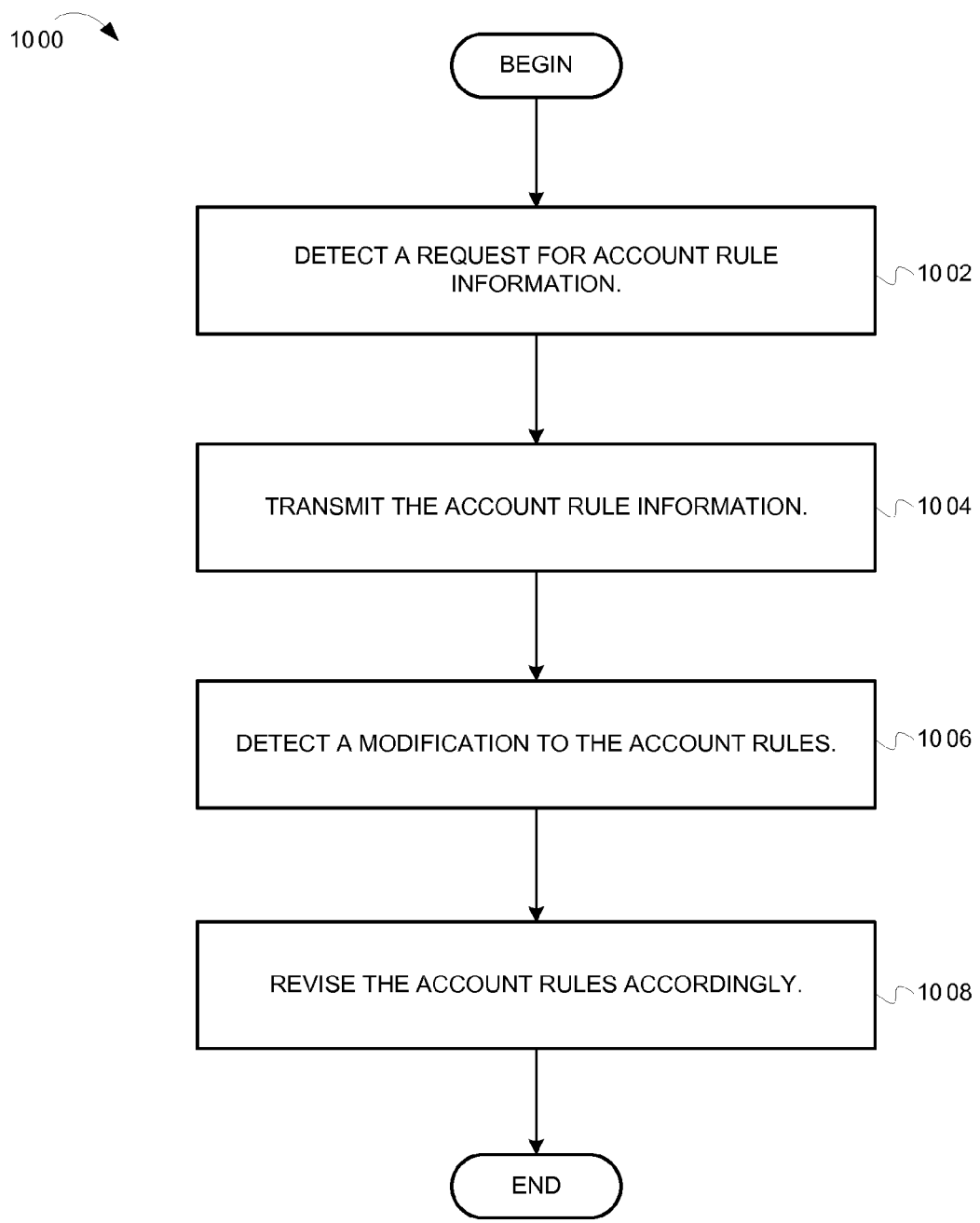
FIG. 10 is a flow diagram illustrating operations for processing and storing account rules, according to example embodiments of the invention.

FIG. 10 is a flow diagram illustrating operations for processing and storing account rules, according to example embodiments of the invention. The flow diagram 1000 begins at block 1002.

At block 1002, the account controller 318 detects a request for account rule information. In one embodiment, the account controller 318 receives the request from a wagering game machine 302 that is presenting the account rules interface 802. The account rule information can include account rules associated with a player. The flow continues at block 1004.

At block 1004, the account controller 318 transmits the account rule information to the requester (e.g., a wagering game machine 302). The account rule information can be in a form suitable for populating an account rules interface (e.g., see FIG. 8). The flow continues at block 1006.

At block 1006, the account controller 318 detects a modification to the account rules associated with a player identifier. In some embodiments, the account controller 318 receives, from a wagering game machine 302, a request to modify account rules associated with a player. The request can enumerate account rule parameters for a new account rule or for an existing rule. The flow continues at block 1008.

At block 1008, the account controller 318 revises the account rules accordingly. For example, the account controller 318 modifies a player's account rules using the rule parameters received at block 1006. In some embodiments, the account controller 318 notifies the player that the account rules have been modified successfully or that there was an error updating the account rules. From block 1008, the flow ends.

This section continues with a discussion about operations for enforcing the account rules.

Figure 11:
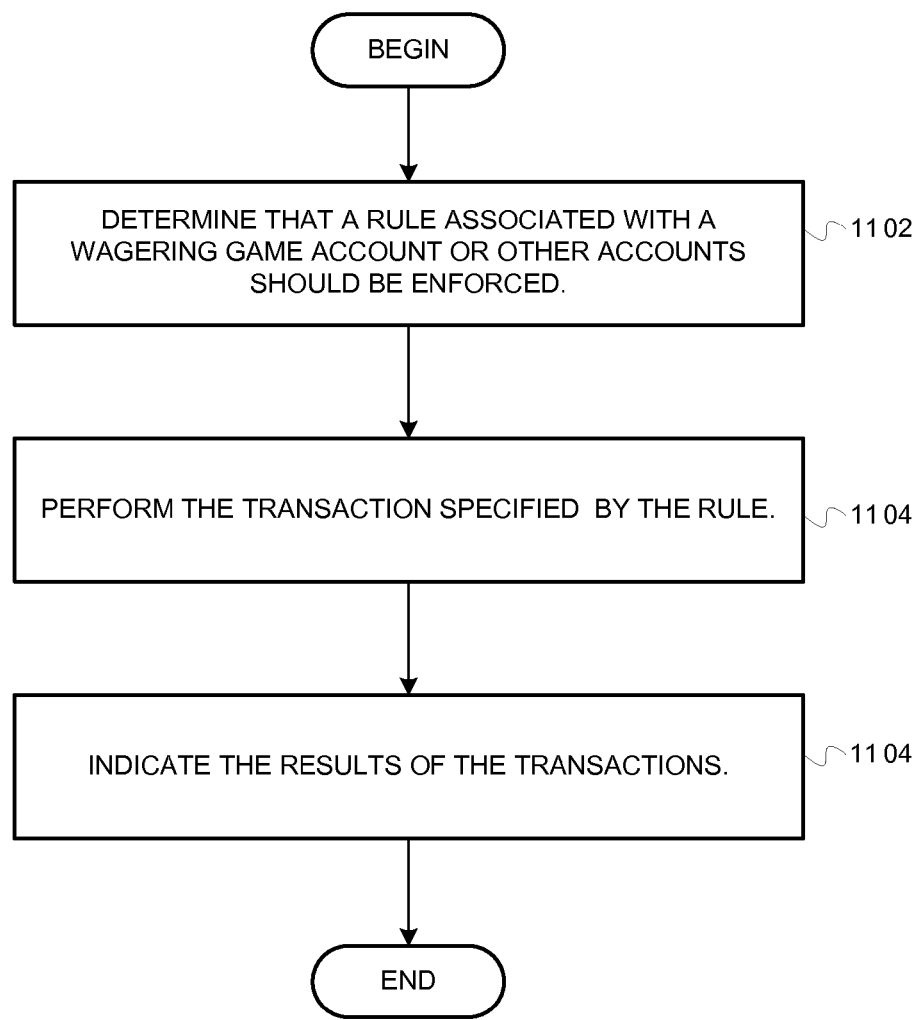
FIG. 11 is a flow diagram illustrating operations for enforcing account rules in a wagering game system, according to example embodiments of the invention.

FIG. 11 is a flow diagram illustrating operations for enforcing account rules in a wagering game system, according to example embodiments of the invention. The flow 1100 begins at block 1102.

At block 1102, the account controller 318 determines that a rule associated with a wagering game account should be enforced. As noted above, account rules can be associated with trigger condition. For example, winning jackpots, placing wagers, playing certain games, account balances, time of day, total amount of wagers made, etc. can trigger account rules to perform financial transactions. In some embodiments, the wagering game machines 302 notifies the to the account controller 318 about any information relevant to a player's account rules. For example, wagering game machines 302 can notify the account controller 318 when a player wins a jackpot, makes a wager, plays a game, begins a game session, ends a game session, etc. In response, the account controller 318 can determine whether any account rules' trigger conditions have been satisfied. In other embodiments, the wagering game machines 302 can acquire a list of account rules and notify the account controller 318 only when a trigger condition has been satisfied.

In some embodiments, account rules are not associated with wagering game events. For example, account rules can be related to time, account balances, account transactions, etc. Thus, the account controller 318 can use time, account balances, account transactions, and other non-event-related information to determine that an account rules should be enforced. The flow continues at block 1104.

At block 1104, the account controller 318 performs transactions specified in the account rules that are being enforced. For example, if an account rule specifies a transfer of funds, the account controller 318 transfers funds between accounts. As another example, if the account rule specifies that an account is to be locked, the account controller 318 locks the account. As yet another example, if the account rule specifies that certain transactions are prohibited (e.g., withdrawals from a retirement account), the account controller 318 marks the account as deposit only. The account controller 318 may enforce some account rules with assistance from the financial institution computer 324. The flow continues at block 1106.

At block 1106, the account controller 318 provides an indication of the financial transactions. In some embodiments, the account controller 318 can transmit a transaction statement for display on the wagering game machine 302 at which the player is present (e.g., in an account interface). Alternatively, the account controller 318 can notify the player via email, instant message, telephone message, etc. From block 1106, the flow ends.

Example Wagering Game Machines

Figure 12:
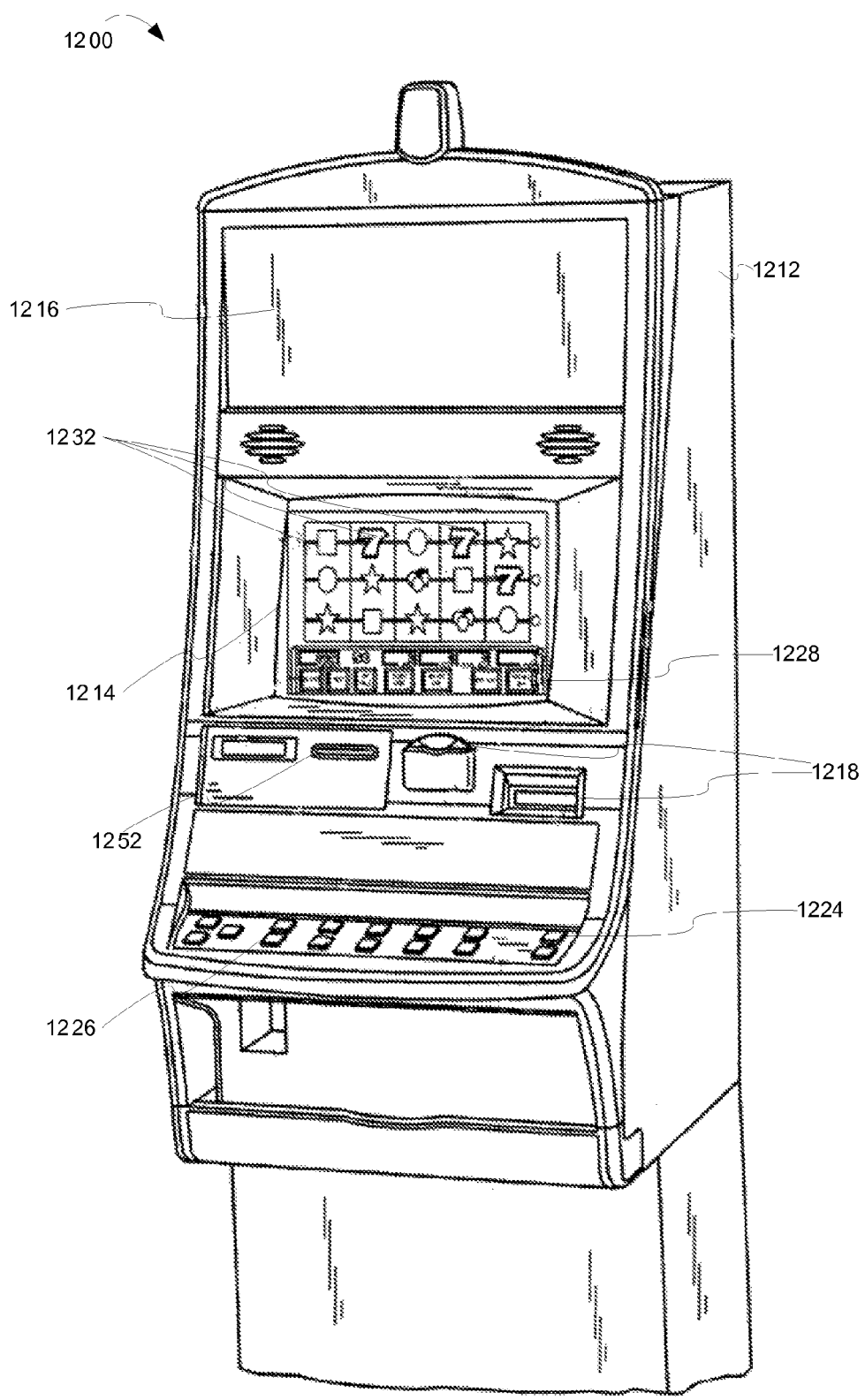
FIG. 12 is a perspective view of a wagering game machine, according to example embodiments of the invention.

FIG. 12 is a perspective view of a wagering game machine, according to example embodiments of the invention. Referring to FIG. 12, a wagering game machine 1200 is used in gaming establishments, such as casinos. According to embodiments, the wagering game machine 1200 can be any type of wagering game machine and can have varying structures and methods of operation. For example, the wagering game machine 1200 can be an electromechanical wagering game machine configured to play mechanical slots, or it can be an electronic wagering game machine configured to play video casino games, such as blackjack, slots, keno, poker, blackjack, roulette, etc.

The wagering game machine 1200 comprises a housing 1212 and includes input devices, including value input devices 1218 and a player input device 1224. For output, the wagering game machine 1200 includes a primary display 1214 for displaying information about a basic wagering game. The primary display 1214 can also display information about a bonus wagering game and a progressive wagering game. The wagering game machine 1200 also includes a secondary display 1216 for displaying wagering game events, wagering game outcomes, and/or signage information. While some components of the wagering game machine 1200 are described herein, numerous other elements can exist and can be used in any number or combination to create varying forms of the wagering game machine 1200.

The value input devices 1218 can take any suitable form and can be located on the front of the housing 1212. The value input devices 1218 can receive currency and/or credits inserted by a player. The value input devices 1218 can include coin acceptors for receiving coin currency and bill acceptors for receiving paper currency. Furthermore, the value input devices 1218 can include ticket readers or barcode scanners for reading information stored on vouchers, cards, or other tangible portable storage devices. The vouchers or cards can authorize access to central accounts, which can transfer money to the wagering game machine 1200.

The player input device 1224 comprises a plurality of push buttons on a button panel 1226 for operating the wagering game machine 1200. In addition, or alternatively, the player input device 1224 can comprise a touch screen 1228 mounted over the primary display 1214 and/or secondary display 1216.

The various components of the wagering game machine 1200 can be connected directly to, or contained within, the housing 1212. Alternatively, some of the wagering game machine's components can be located outside of the housing 1212, while being communicatively coupled with the wagering game machine 1200 using any suitable wired or wireless communication technology.

The operation of the basic wagering game can be displayed to the player on the primary display 1214. The primary display 1214 can also display a bonus game associated with the basic wagering game. The primary display 1214 can include a cathode ray tube (CRT), a high resolution liquid crystal display (LCD), a plasma display, light emitting diodes (LEDs), or any other type of display suitable for use in the wagering game machine 1200. Alternatively, the primary display 1214 can include a number of mechanical reels to display the outcome. In FIG. 12, the wagering game machine 1200 is an "upright" version in which the primary display 1214 is oriented vertically relative to the player. Alternatively, the wagering game machine can be a "slant-top" version in which the primary display 1214 is slanted at about a thirty-degree angle toward the player of the wagering game machine 1200. In yet another embodiment, the wagering game machine 1200 can exhibit any suitable form factor, such as a free standing model, bartop model, mobile handheld model, or workstation console model.

A player begins playing a basic wagering game by making a wager via the value input device 1218. The player can initiate play by using the player input device's buttons or touch screen 1228. The basic game can include arranging a plurality of symbols along a payline 1232, which indicates one or more outcomes of the basic game. Such outcomes can be randomly selected in response to player input. At least one of the outcomes, which can include any variation or combination of symbols, can trigger a bonus game.

In some embodiments, the wagering game machine 1200 can also include an information reader 1252, which can include a card reader, ticket reader, bar code scanner, RFID transceiver, or computer readable storage medium interface. In some embodiments, the information reader 1252 can be used to award complimentary services, restore game assets, track player habits, etc.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

The invention claimed is:

1. A method of operating a gaming system primarily dedicated to playing at least one casino wagering game, the gaming system including a gaming cabinet, a random element generator, one or more controllers, an electronic display device, and an electronic input device, the electronic display device and the electronic input device being coupled to the gaming cabinet, the method comprising:
presenting, on the electronic display device an account rule configuration menu that enables a player to define an account rule, the account rule initiating a transfer of funds between a wagering game session account and one or more other financial accounts in response to an activation event during play of the casino wagering game:
receiving, via the electronic input device, player input defining the account rule;
generating one or more random elements with the random element generator;
receiving, via the electronic input device, a wager input to initiate the casino wagering game;
determining, by the one or more controllers, an outcome of the casino wagering game based, at least in part, on the one or more random elements;
presenting the outcome on the electronic display device;
awarding, by the one or more controllers, an award in response to the outcome meeting a predefined award criterion;
detecting the activation event during play of the casino wagering game; and
in response to detecting the activation event, initiating the transfer of funds between the wagering game session account and one or more other financial accounts.

2. The method of claim 1, wherein the transfer of funds includes a transfer of funds from the wagering game session account to one or more of the other financial accounts.

3. The method of claim 1, wherein the transfer of funds includes a transfer of funds from one or more of the other financial accounts to the wagering game session account.

4. The method of claim 1, further comprising:
determining that the transfer of funds was successfully completed; and
presenting, on the electronic display device, an indication that the transfer of funds was successfully completed.

5. A method of operating a wagering game machine primarily dedicated to playing at least one casino wagering game, the wagering game machine including a gaming cabinet, one or more controllers, an electronic display device, and an electronic input device, the electronic display device and the electronic input device being coupled to the gaming cabinet, the method comprising:
presenting, on the electronic display device, an account rule configuration menu, wherein the account rule configuration menu enables a player to define an account rule;
receiving, via the electronic input device, user input, wherein the user input defines the account rule, wherein the account rule comprises a transfer of funds between a wagering game session account and one or more other financial accounts, wherein the account rule includes an activation event, and wherein the transfer of funds is to occur upon occurrence of the activation event;
receiving, at the wagering game machine, an outcome of the casino wagering game based on one or more random elements generated by a random element generator;
presenting, on the electronic display device, the outcome of the casino wagering game;
awarding, by the one or more controllers, an award in response to the outcome meeting a predefined award criterion;
detecting the occurrence of the activation event during play of the casino wagering game; and
in response to detecting the occurrence of the activation event, causing the transfer of funds between the wagering game session account and one or more of the other financial accounts, according to the account rule.

6. The method of claim 5, wherein the transfer of funds transfers funds from the wagering game session account to one or more of the other financial accounts.

7. The method of claim 5, wherein the transfer of funds transfers funds from one or more of the other financial accounts to the wagering game session account.

8. The method of claim 5, wherein the activation event includes one or more conditions, and wherein one or more of the conditions must be satisfied for the occurrence of the activation event.

9. The method of claim 5, wherein the activation event is related to one or more of a wagering game session balance, recent wagering game activity, a balance of one or more of the other accounts, a time of day, a result of a casino wagering game session, a result of a casino wagering game round, and the outcome of the casino wagering game.

10. A gaming system primarily dedicated to playing at least one casino wagering game, the gaming system comprising:
a gaming cabinet for housing components associated with the casino wagering game;
an electronic display device coupled to the gaming cabinet configured to present an account rule configuration menu that enables a player to define an account rule, the account rule initiating a transfer of funds between a wagering game session account and one or more other financial accounts in response to an initiation condition occurring in play of the casino wagering game;

an electronic input device coupled to the gaming cabinet, the electronic input device configured to receive a first physical input from a player to initiate the casino wagering game and transform the first physical input into an electronic data signal and further configured to receive a second physical input from the player defining the account rule;

a random element generator configured to generate one or more random elements; and one or more controllers configured to:
  initiate the casino wagering game in response to the electronic data signal from the electronic input device;
  determine an outcome of the casino wagering game based, at least in part, on the one or more random elements;
  direct the electronic display device to present the outcome;
  award an award in response to the outcome meeting a predetermined award criterion;
  detect the initiation condition in play of the casino wagering game; and
  in response to detecting the initiation condition, initiate a transfer between the wagering game session account and one or more other financial accounts.

11. The gaming system of claim 10, wherein the initiation condition includes one of a wagering game session account balance, a recent change in the wagering game session account balance, and increase in the wagering game session account balance, and a decrease in the wagering game account balance.

12. The gaming system of claim 10, wherein the transfer between the wagering game session account and one or more other financial accounts includes a transfer from the wagering game session account to one or more of the other financial accounts.

13. The gaming system of claim 10, wherein the transfer between the wagering game session account and one or more other financial accounts includes a transfer from one or more of the other financial accounts to the wagering game session account.

14. The gaming system of claim 10, wherein the one or more other financial accounts include one or more of a checking account, a savings account, a charity account, an education account, a money market account, and a retirement account.

15. A method of operating a gaming system primarily dedicated to playing at least one casino wagering game, the gaming system including a gaming cabinet, a random element generator, one or more controllers, an electronic display device, and an electronic input device, the electronic display device and the electronic input device being coupled to the gaming cabinet, the method comprising:
  presenting, on the electronic display device, an account rule configuration menu, wherein the account rule configuration menu enables a player to define an account rule, wherein the account rule relates to a wagering game session account associated with the player, wherein the account rule includes an initiation condition, and wherein occurrence of the initiation condition causes a transfer of funds between the wagering game session account and one or more other financial accounts;
  receiving, via the electronic input device, player input defining the account rule;
  receiving, via the electronic input device, a wager input to initiate the casino wagering game;
  generating one or more random elements with the random element generator;
  determining, by the one or more controllers, an outcome of the casino wagering game based, at least in part, on the one or more random elements;
  presenting, on the electronic display device, the casino wagering game;
  presenting, on the electronic display device, the outcome;
  awarding, by the one or more controllers, an award in response to the outcome meeting a predefined award criterion;
  depositing, in the wagering game session account, the award;
  monitoring the wagering game session account for the occurrence of the initiation condition;
  detecting, based, at least in part, on the monitoring the wagering game session account, the occurrence of the initiation condition; and
  causing, in response to the detecting the occurrence of the initiation condition, the transfer of funds among the wagering game session account and one or more of the other financial accounts.

16. The method of claim 15, wherein the initiation condition is a win greater than a predetermined amount during a wagering game session.

17. The method of claim 15, wherein the initiation condition is a loss greater than a predetermined amount during a wagering game session.

18. The method of claim 15, wherein the initiation condition is a wagering game session account balance greater than a predetermined amount.

19. The method of claim 15, wherein the initiation condition is a wagering game session account balance less than a predetermined amount.

20. A method of operating a wagering game machine primarily dedicated to playing at least one casino wagering game, the wagering game machine including a gaming cabinet, one or more controllers, an electronic display device, and an electronic input device, the electronic display device and the electronic input device being coupled to the gaming cabinet, the method comprising:
  presenting, on the electronic display device, an account rule configuration menu, wherein the account rule configuration menu enables a player to define an account rule;
  receiving, via the electronic input device, user input, wherein the user input defines the account rule, wherein the account rule comprises a transfer of funds between a wagering game session account and one or more other financial accounts, wherein the account rule includes an activation event, and wherein the transfer of funds is to occur upon occurrence of the activation event;
  receiving, at the wagering game machine, an outcome of the casino wagering game based on one or more random elements generated by a random element generator;
  presenting, on the electronic display device, the outcome of the casino wagering game;
  awarding, by the one or more controllers, an award in response to the outcome meeting a predefined award criterion, wherein the award is deposited in the wagering game session account;
  detecting, based on a balance of the wagering game session account, an occurrence of the activation event; and
  causing, based on the detecting the occurrence of the activation event, the transfer of funds between the wagering game session account and one or more of the other financial accounts, according to the account rule.

21. The method of claim 20, wherein the transfer of funds transfers funds from the wagering game session account to one or more of the other financial accounts.

22. The method of claim 20, wherein the transfer of funds transfers funds from one or more of the other financial accounts to the wagering game session account.

23. The method of claim 20, wherein the activation event includes one or more conditions, and wherein one or more of the conditions must be satisfied for the occurrence of the activation event.

* * * * *